2,431,798

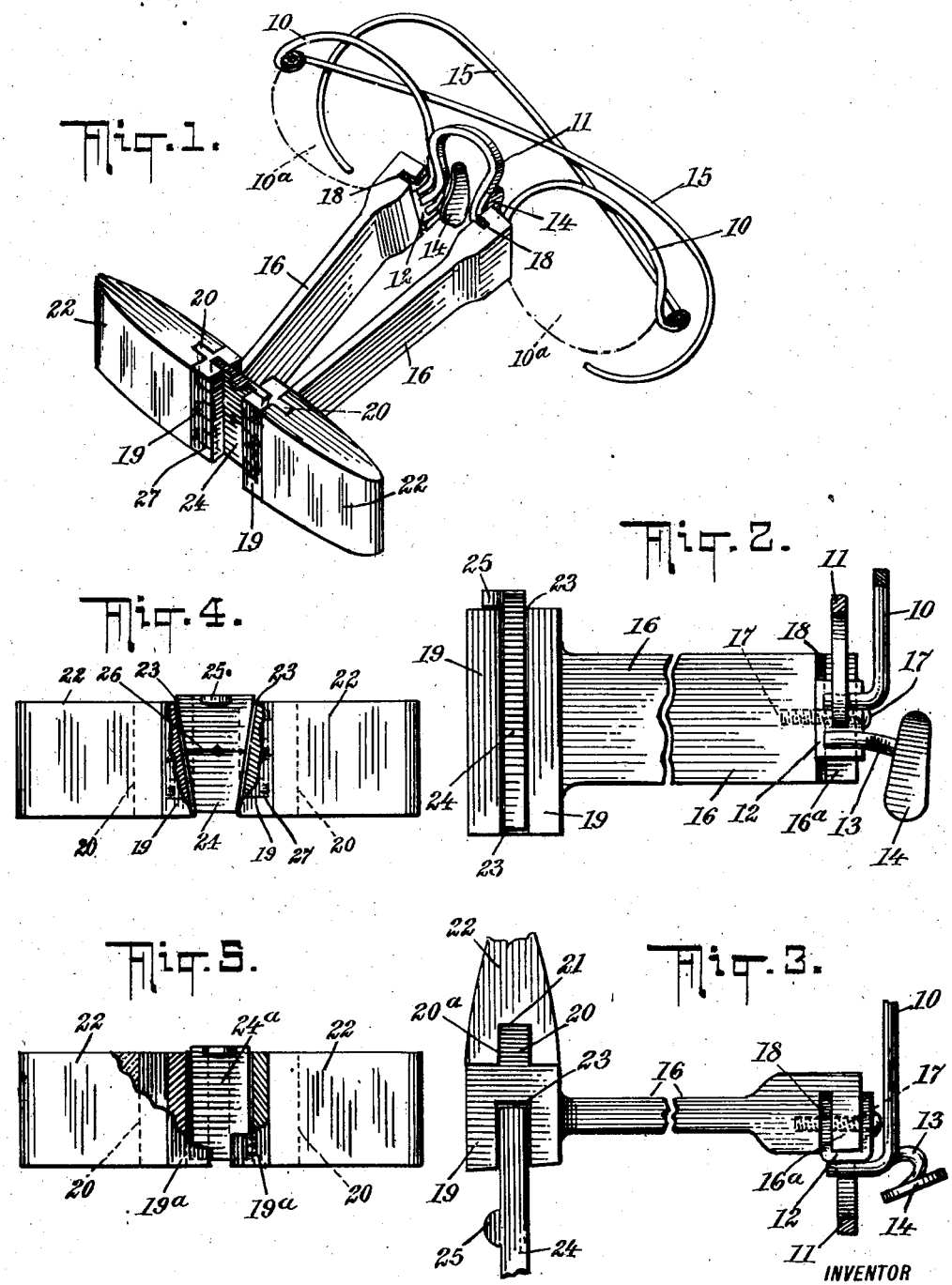
Dec. 2, 1947.        M. FROMMER        2,431,798
BINOCULAR SPECTACLES
Filed Aug. 19, 1944
INVENTOR
MOSES FROMMER
BY
Conrad A. Dieterich
his ATTORNEY Patented Dec. 2, 1947

UNITED STATES PATENT OFFICE 2,431,798

BINOCULAR SPECTACLES

Moses Frommer, Brooklyn, N. Y.

Application August 19, 1944, Serial No. 550,263

8 Claims. (Cl. 88—41)

1

My invention relates to improvements in magnifying glasses, and the same has for its object to provide a simple, light, inexpensive and reliable binocular pair of glasses.

Further, said invention has for its object to provide a mounting or frame for spectacles in which the binocular attachment will be of simple construction and minimum weight, and which will not obstruct or interfere with the normal vision of the user when the magnifying lenses are not required.

Further, said invention has for its object to provide a binocular spectacle in which the magnifying lenses are supported without requiring the use of individual or separate enclosing frames or rims.

Further, said invention has for its object to provide a binocular spectacle which will be lighter in weight, more comfortable to the user, and which may be readily adapted for attachment to, or used in connection with, the majority of spectacle frame constructions now in general use.

Further, said invention has for its object to provide a glass of the character specified which may be constructed as a complete, separate unit to be worn as such by the user, or to be employed in combination with, or supplemental to, the glasses normally worn by the user to correct visual deficiencies or defects.

Other objects will in part be obvious and in part be pointed out hereinafter.

To the attainment of the aforesaid objects and ends, the invention consists in the novel features of construction, and in the combination, connection and arrangement of parts hereinafter more fully described and then pointed out in the claims.

In the accompanying drawings—

Figure 1 is a perspective view showing one form of binocular spectacles constructed according to, and embodying my said invention;

Fig. 2 is an enlarged detail side elevation showing the inner side of one of the magnifying lens supporting arms;

Fig. 3 is a detail top view of the parts shown in side elevation at Fig. 2;

Fig. 4 is an enlarged detail front view, partly in section, showing the construction of the forward ends of the lens supporting arms, and the means for effecting the spacing of the lenses, and Fig. 5 is a view similar to Fig. 4, illustrating a modification.

In said drawings, the mounting or frame comprises a pair of frame members or bows 10, connected at their inner ends by a more or less resilient bridge member 11, and adapted to receive lenses 10ª.

At the junction of the inner ends of said frame members or bows 10 with the ends of the bridge member 11 are secured U-shape clips 12 having rearwardly extending arms 13 to which are secured nose pads 14. 15 denote the usual temples which are pivotally secured to the outer ends of the frame members or bows 10.

16 denotes a pair of forwardly-extending converging arms 16 which may be made of metal or any other desirable material and secured at their inner ends to the U-shape clips 12 of the members or bows 10 by screws or rivets 17. Where the material of the arms 16 consists of factitious material, the same is preferably made of substantially rectangular form in cross section, and the inner side of each arm, adjacent its rear end, vertically grooved at 18 to form an end portion 16ª embraced by the separated ends of the U-shape clip 12. The said portion 16ª and the two ends of the U-shape clip 12 are secured to the arm 16 by the screw 17 extending through said parts and longitudinally into the rear end of the arm 16, to hold said arm rigidly secured to the frame members 10.

The forward ends of the arms 16 are provided with vertical heads 19, each of which is disposed at right angles to the longitudinal axis of its respective arm, and provided in its outer side with a laterally-extending rib 20 substantially co-extensive with the height of said head. Each rib 20 is adapted to fit into and be secured by cement 20ª in a channel 21 formed in the inner vertical edge of its respective magnifying lens 22. As the magnifying lenses 22 are usually segments of double convex lenses, the inner edge of the lens is considerably thicker than the opposite or outer edge thereof, and thus provides a sufficient thickness of glass to permit of the cutting the necessary channel 21 therein.

The inner, opposing sides of the heads 19 are provided with narrow channels or slits 23 which taper downwardly towards each other with the deeper portion of the channel uppermost the said channels 23 in the heads 19 jointly form a groove having diverging walls. Within said tapering channels 23 is disposed an adjustable, more or less tightly-fitting, wedge-shape spacing member 24 having a finger portion 25 at its upper edge to facilitate the manipulation thereof. By moving the spacing member up or down, the distance separating the magnifying lenses 22 may be increased or diminished within limits to bring said magnifying lenses into due spaced relation with respect to the distance between the eyes of the wearer, or into due visual alignment with the glasses worn by the user to correct visual deficiencies.

In order to aid the user in effecting the proper adjustment of the magnifying lenses 22 with respect to each other, the spacing member 24 is provided with a gauge mark 26, and the forward sides of heads 19 provided with suitable calibrations 27 as, for example, 1, 2, 3, to cooperate with the gauge mark 26, to insure the proper position of said magnifying lenses.

In Fig. 5 is illustrated a modification in which the heads 19a are provided with straight vertical channels 21a to receive a spacing member 24a having parallel vertical sides. In this construction it is desirable to provide a series of spacing members of different widths to effect the desired separation of the magnifying lenses from each other.

The arms 16 are normally maintained in converging relation with the heads 19, at their outer ends in engagement under tension exerted by the spring action of the bridge piece 11, and this tension will be increased when said arms are separated to receive and hold intermediate the same the spacing member 24.

The spacing members in each construction will be held to their adjusted positions by the frictional engagement of said spacing members with the walls or sides of their respective channels, and by the tension of the arms 16, due to the tension of the bridge 11.

It is to be noted that while I have shown the arms 16 as secured to the frame members 10 to form therewith a complete unit which may be used in connection with a pair of spectacles or eyeglass such as 10a worn by the user to correct defects of vision, as well as by persons having normal vision not requiring the use of ordinary glasses, and that in those instances where a person normally requires glasses to correct visual deficiencies, the inner ends of the arms 16 may be secured directly to the frames of such correctional glasses.

Having thus described my said invention, what I claim and desire to secure by Letters Patent is:

1. A device of the character described comprising a frame including a pair of frame members and a bridge piece connecting said frame members, a pair of arms each secured at its inner end to one of said frame members, a rib and a channel at the forward end of each arm, a pair of lenses, each having a channel at its inner end to receive the cooperating rib of its respective arm, and a separate spacing member movably disposed within the channels at the forward ends of said arms for maintaining the outer ends of said arms and said lenses duly spaced relative to each other.

2. A device of the character described comprising a frame including a pair of frame members and a bridge piece connecting said frame members, a pair of arms each secured at its inner end to one of said frame members, and extending forwardly therefrom, a rib at the forward end of each arm, a magnifying lens for each arm having a channel at its inner end receiving the rib of its respective arm; the outer opposing ends of said arms having channels therein, and a wedge-shaped spacing member movably disposed within said last-named channels for varying the spacing of and maintaining said magnifying lenses in duly spaced relation relative to each other.

3. A device of the character described comprising a frame including a pair of frame members and a bridge piece connecting said frame members, a pair of arms each secured at its inner end to one of said frame members and extending forwardly therefrom; the forward ends of said arms being maintained yieldingly in contact under tension of said frame, a rib at the forward end of each arm, a magnifying lens for each arm having a channel at its inner end receiving the rib of its respective arm; the outer ends of said arms having channels therein, and a wedge-shaped spacing member movably disposed within said last-named channels for varying of the spacing of said magnifying lenses and maintaining the same in duly spaced relation relative to each other.

4. A device of the character described comprising a frame including a pair of lens-receiving members and a bridge piece connecting said members, lenses mounted in said members, a pair of arms each secured at one end to said frame and having their free ends extending outwardly therefrom and held in yielding engagement under tension of said frame, heads at the outer ends of said arms each having a laterally-extending rib at one side thereof and an inclined channel in the opposite side thereof, a magnifying lens for each arm having a channel in its inner edge to receive the rib of its respective head, and a removable wedge-shaped spacing member movably disposed within the inclined channels in said heads for varying the spacing of said magnifying lenses and maintaining the same in adjusted relation.

5. A device of the character described comprising a frame including a pair of frame members and a bridge piece connecting said frame members, a pair of arms each secured at one end to said frame members and having their free ends extending outwardly therefrom and held in yielding engagement under tension of said frame, heads at the outer ends of said arms each having a laterally-extending rib at one side thereof and an inclined channel in the opposite side thereof, a magnifying lens for each arm having a channel in its inner edge to receive the rib of its respective head, a wedge-shaped spacing member movably disposed within the inclined channels in said heads for maintaining said magnifying lenses in spaced relation, and indicating means disposed partly on said heads and partly on said spacing member for indicating the spacing of said lenses relative to each other.

6. A device of the character described comprising a frame, arms secured at their inner ends to said frame and extending forwardly therefrom, a pair of lenses, attaching members at the outer ends of said arms for securing said arms separately to their respective lenses, receiving means at the inner edges of said attaching members, and a separate spacing member interposed between the outer ends of said arms and extending into the receiving means of said attaching members for holding the outer ends of said arms and the lenses carried thereby spaced apart relative to each other.

7. A device of the character described comprising a frame including a pair of frame members and a bridge piece connecting said frame members, a pair of arms each secured at one end to said frame members and having their free ends extending outwardly therefrom and held in yielding engagement under tension of said frame, heads at the outer ends of said arms arranged at right angles thereto and each having a laterally-extending rib at the inner side thereof and an inclined channel in the outer side thereof; said inclined channels jointly forming a groove having vertically-diverging walls, a magnifying lens for each arm having a channel in its inner edge to receive the rib of its respective head, and a wedge-shaped spacing member movably disposed within said inclined channels in said heads for maintaining said magnifying lenses in spaced relation.

8. A device of the character described comprising a frame including a pair of frame members and a bridge piece connecting said frame members, a pair of arms each secured at one end to said frame members and having their free ends extending outwardly therefrom and held in yielding engagement under tension of said frame, heads at the outer ends of said arms arranged at right angles thereto and each having a laterally-extending rib at the inner side thereof and an inclined channel in the outer side thereof; said inclined channels jointly forming a groove having vertically-diverging walls, a magnifying lens for each arm having a channel in its inner edge to receive the rib of its respective head, a wedge-shaped spacing member movably disposed within said inclined channels in said heads for maintaining said magnifying lenses in spaced relation, and indicating means disposed partly on said heads and partly on said spacing member for indicating the spacing of said lenses relative to each other.

MOSES FROMMER.

REFERENCES CITED

The following references are of record in the file of this patent:

UNITED STATES PATENTS

| Number    | Name    | Date          |
|-----------|---------|---------------|
| 1,635,062 | Tully   | July 5, 1927  |
| 945,078   | Beebe   | Jan. 4, 1910  |
| 2,017,233 | Chester | Oct. 15, 1935 |
| 999,517   | Nolte   | Aug. 1, 1911  |
| 1,905,675 | Baker   | Apr. 25, 1933 |
| 2,155,575 | Wittig  | Apr. 25, 1939 |
| 1,033,119 | Pixley  | July 23, 1912 |